No. 767,912. PATENTED AUG. 16, 1904.
C. NIELSEN.
ENGAGING OR DISENGAGING DEVICE FOR AUTOMATIC AIR PUMPS.
APPLICATION FILED DEC. 10, 1903.
NO MODEL. 2 SHEETS—SHEET 1.
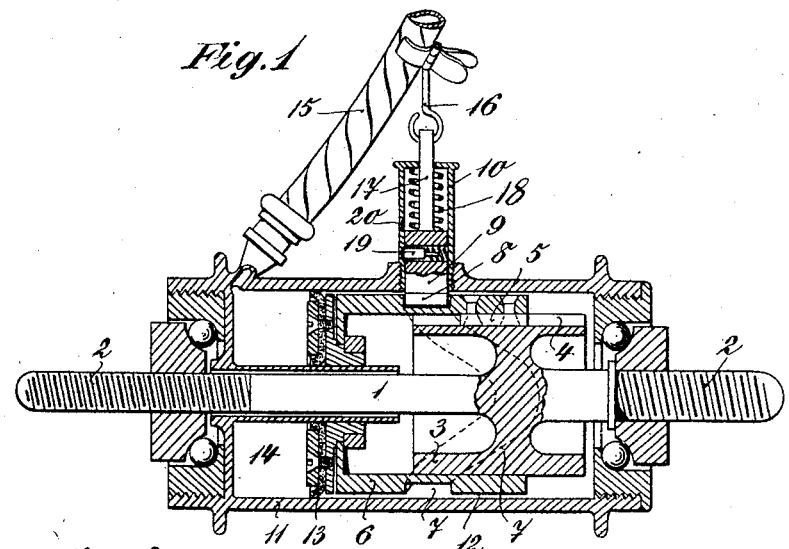
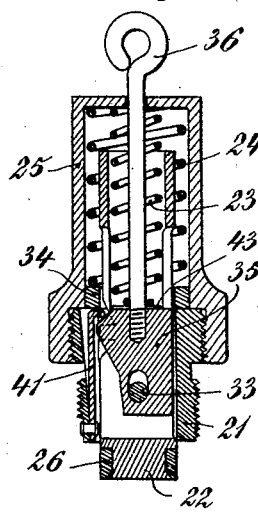
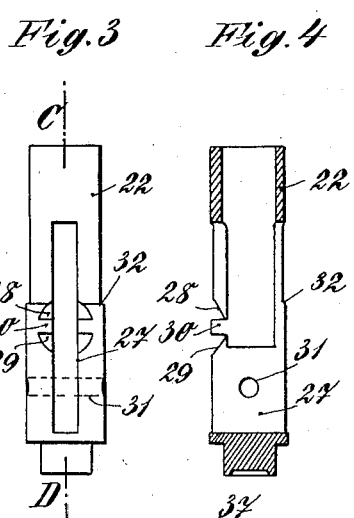
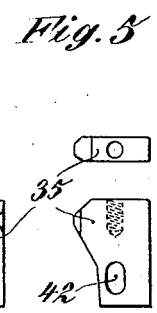
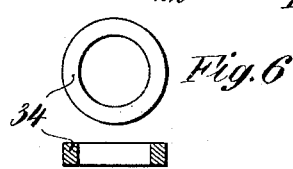
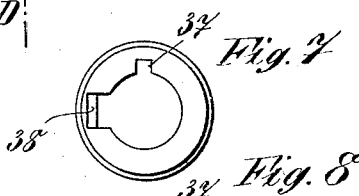
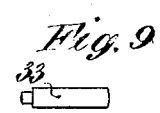
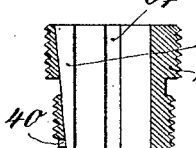
Witnesses
Inventor
Carl Nielsen,
By
Attorney No. 767,912. PATENTED AUG. 16, 1904.
C. NIELSEN.
ENGAGING OR DISENGAGING DEVICE FOR AUTOMATIC AIR PUMPS.
APPLICATION FILED DEC. 10, 1903.
NO MODEL. 2 SHEETS—SHEET 2.
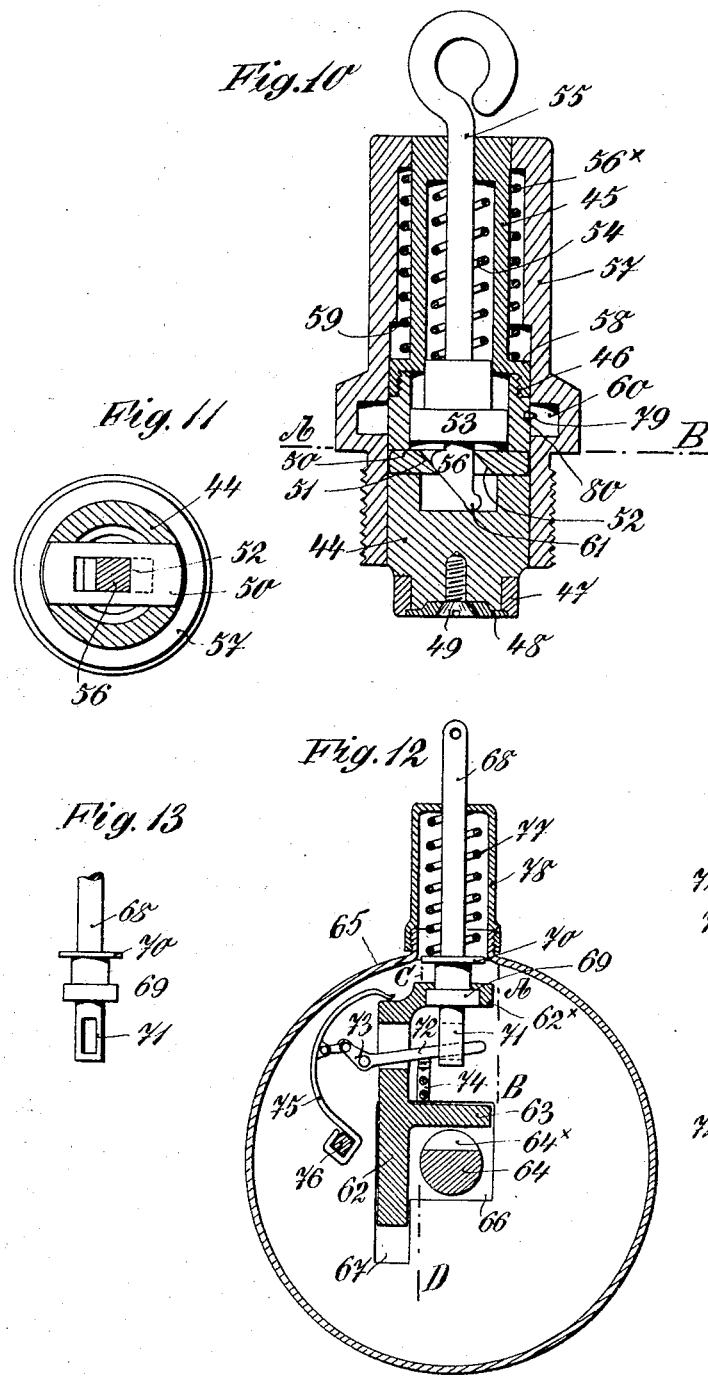
Witnesses
Inventor
Carl Nielsen.
Attorney No. 767,912.

Patented August 16, 1904.

UNITED STATES PATENT OFFICE.

CARL NIELSEN, OF COPENHAGEN, DENMARK.

ENGAGING OR DISENGAGING DEVICE FOR AUTOMATIC AIR-PUMPS.

SPECIFICATION forming part of Letters Patent No. 767,912, dated August 16, 1904.

Application filed December 10, 1903. Serial No. 184,660. (No model.)

*To all whom it may concern:*

Be it known that I, CARL NIELSEN, a subject of the King of Denmark, residing at Copenhagen, in the Kingdom of Denmark, have invented a new and useful Engaging and Disengaging Device for Automatic Air-Pumps and the Like, of which the following is a specification.

Automatic air-pumps, arranged, for instance, within the naves of driving rear wheels of cycles and the like for replenishing the pneumatic tires, require to be engaged and disengaged at the proper moment and not inadvertently. The moment the pressure of the compressed air in the pneumatic tire sinks below a determined limit the automatic air-pump must be started to replenish the tire, and it is required to work until the pressure within the pneumatic tire attains a certain other limit, when the air-pump should again be stopped, not earlier. This is necessary to prevent the automatic air-pump from wearing off too quickly and to insure the proper pressure within the pneumatic tire. This was hitherto effected by means of an engaging and disengaging device, which for the sake of clearness will be described hereinafter. It was provided with a single spring. Experience shows, however, that this device worked unsatisfactorily, whereby a certain part of it and also the automatic air-pump were subjected to a rapid wear and tear.

My invention relates to improvements in such engaging and disengaging devices whereby the said defect is removed; and the object of my invention is to so arrange the engaging and disengaging device that slight variations in the pressure of the compressed air within the pneumatic tire will have no influence whatever upon this device and that the latter is engaged and again disengaged at the proper moment.

I will now proceed to describe my invention with reference to the accompanying drawings, in which—

Figure 1 is a longitudinal section through the nave of a rear cycle-wheel, the automatic air-pump contained therein, and the engaging and disengaging device as hitherto employed. Fig. 2 is a vertical longitudinal section, on an enlarged scale, through an improved engaging and disengaging device according to my invention. Figs. 3 to 9 are details of the same, which will be referred to later on. Fig. 10 is a vertical longitudinal section through a modified form of the improved engaging and disengaging device. Fig. 11 is a horizontal section through the piston of the same on the line A B in Fig. 10. Fig. 12 is a cross-section through a pump-cylinder and shows another modification of the engaging and disengaging device in elevation. Fig. 13 is a view of the part 69 in Fig. 12 seen from A B in the direction of the arrows. Fig. 14 is a section through the line C D in Fig. 12 on an enlarged scale, and Fig. 15 is a similar section through a modification of the part 74.

Similar characters of reference refer to similar parts throughout the several views.

The axle 1 in Fig. 1 is assumed to be fastened in the frame of a cycle in the ordinary manner by means of its threaded ends 22 and nuts. (Not shown.) The axle 1 is made in one piece with a cylinder 3, provided with a longitudinal groove 4. Into this groove 4 engages a feather 5, secured on the inside of the piston 6 of the automatic air-pump. Thereby the piston 6 is prevented from turning while it is capable of a longitudinal motion. This piston 6 is provided on its cylindrical surface with a cam-groove 7, into which the roller 8 on the piston 9 of the hitherto-known engaging and disengaging device can engage. This piston 9 reciprocates in the cylinder 10, screwed into the nave 11 of the wheel, and as this nave 11 partakes in the revolution of the wheel it will be understood that during the revolution of the nave 11 the roller 8, engaging in the cam-groove 7, will cause the air-piston 6 to reciprocate, whereby the air-pump is actuated, the air being sucked through the right ball-bearing and suitable grooves 12 into the air-cylinder 14, past the opened leather lid 13, during the stroke of the piston 6 from left to right, while the air is compressed and conveyed through a suitable hose 15 to the pneumatic tire during the stroke of the piston 6 from right to left. The hose 15 is connected with the rod 17 of the piston 9 by means of a hook 16 or the like and is arranged to occupy two different positions—viz., the one when it is stretched on the pneumatic tire being sufficiently filled and the other position when it is slack on the pressure within the pneumatic tire having lowered. The piston 9 is subjected to the pressure of a single spring 18 and is provided with a spring-pressed bolt 19, beveled off on its external end and adapted to engage in either of two holes 20 in the cylinder 10. The spring 18 was required to press the piston 9 downward into engagement with the cam-groove 7 of the air-piston 6 the moment the hose 15 became slack, and the spring-pressed bolt 19 was to secure the piston 9 in its lowest position, only when the hose 15 became sufficiently stretched it was to overcome the resistance of the spring acting upon the bolt 19 and then that of the spring 18, so as to raise the roller 8 out of engagement with the cam-groove 7, whereupon the spring-pressed bolt 19 was to secure the piston 9 in its upper position. Experience shows, however, that this device worked very irregularly, so that both the roller 8 and the air-piston 6 were rapidly worn off and destroyed. To remedy this defect, I employ the improved engaging and disengaging device shown at Fig. 2. It comprises a cylinder 21, a piston 22, two springs 23 and 24, and a cap 25. The cylinder 21 is represented in plan and vertical longitudinal section at Figs. 7 and 8, respectively. The piston 22 is shown at Fig. 3 in elevation and at Fig. 4 in a vertical longitudinal section on the line C D in Fig. 3. It is made hollow in the upper part for receiving a disk 43 and the internal spring 23, which bears with its upper end against the top of the cap 25 and with its lower end on the disk 43, resting on the bottom of the cylindrical bore. The lower end of the piston 22 is adapted for receiving a roller 26, which is then secured by a rim formed by riveting the bottom edge of the piston end. The piston 22 is provided with a longitudinal slot 27 and four notches 28 and 29, leaving two noses 30 between them. The piston 22 is further provided with a cross-hole 31 for a pin 33 (see Fig. 9) and with a shoulder 32 for receiving a ring 34. (Shown in plan and section at Fig. 6.) The external spring 24 is arranged to bear with its upper end against the top of the cap 25 and with its lower end on the ring 34. A slotted latch 35 (shown in three different views at Fig. 5) is introduced into the slot 27 of the piston 22 and secured by the pin 33, so that it is only capable of shifting a little up and down. This latch 35 is rigidly connected with a hooked rod 36, passing through a hole in the top of the cap 25, and is thereby to be connected with the hose 15 in Fig. 1 by means of a hook 16 or the like. The cylinder 21 is internally provided with a longitudinal groove 37, into which the one end of the pin 33 engages for guiding the piston 22. The cylinder 21 is, moreover, provided with an inclined groove 38 on the inside and a face 39 on the outside; also, with a hole 40. A leaf-spring 41 is secured within the inclined groove 38 by means of a rivet passing through the hole 40 and riveted on the face 39. This leaf-spring 41 is bent at its upper end and is adapted for normally snapping either over the two noses 30, as shown at Fig. 2, or under them. In Fig. 2 the ring 34 is assumed to be pressed by the external spring 24 on the top surface of the cylinder 21, so that the piston occupies the position shown, in which the roller 26 engages in the cam-groove 7 of the air-piston 6. Therefore the automatic air-pump is actuated for replenishing the pneumatic tire, when the hose 15 will gradually become stretched and move the rod 36, with the latch 35, upward. The slot 42 of the latch 35 is so disposed that in the upper position of the latter its upper surface is on the same level as the bottom, on which the disk 43 rests. When the tension of the stretched hose 15 overcomes the resistance of both springs 23 and 24, the upper inclined face of the latch 35 will move the hooked end of the leaf-spring 41 off the noses 30, whereupon the piston 22 will move upward until the hooked end of the leaf-spring 41 snaps under the noses 30 and secures the piston 22 in its upper position. Then the roller 26 will have got out of engagement with the cam-groove 7.

It will be seen that instead of the single spring 18 in the old device, Fig. 1, two independent springs are now employed in the new device, of which the external one, 24, is preferably made stronger than the internal spring 23. Moreover, the lower inclined surface of the latch 35 (see Fig. 5) is made steeper than the upper inclined surface. The consequence of this is that it is easier to engage the automatic air-pump than to disengage it. Should the pressure within the pneumatic tire sink a little and the hose 15 become a little slack, the weaker spring 23 will already be strong enough to move the latch 35 downward, and thus move the hooked end of the leaf-spring 41 off the lower surfaces of the two noses 30, whereupon the stronger spring 24 will press the piston 22 downward to engage the roller 26 into the cam-groove 7. Thereby the automatic air-pump is started. It is not again disengaged until the pressure within the pneumatic tire has quite reached the highest limit, when the tension of the stretched hose 15 will be sufficient to overcome the combined resistance of the two springs 23 and 24, and thereby to disengage the automatic air-pump in the manner described above.

In the modified engaging and disengaging device (shown at Figs. 10 and 11) the piston is made of two hollow parts 44 and 45, screwed together at 46. On the lower end of the part 44 the roller 47 is secured against shifting by a disk 48 and a screw. The part 44 is provided with openings for a bolt 50, adapted to move across. This bolt 50 has a central opening with two opposed inclined surfaces 51 52. A smaller piston 53 reciprocates within the cavities of the two parts 44 and 45 and is pressed downward by the internal spring 54. It is rigidly connected with the hooked rod 55 and made in one piece with a latch 56 of the shape shown at Fig. 10. The external spring $56^\times$ bears with its upper end against the top of the casing 57 and with its lower end on the shoulder 58 of the part 45. The casing 57 is provided with an internal shoulder 59 for limiting the upward motion of the piston and with an annular recess 60, into which the bolt 50 can engage. The two springs 54 and $56^\times$ are again independent of each other and disposed in the same manner as described above with reference to Fig. 2. Normally the piston 44 45 occupies its upper position, in which the bolt 50 is moved from left to right to engage in the annular recess 60 of the casing 57. On the hose 15 becoming slightly slack the weak spring 54 will be strong enough to press the small piston 53 downward, so that its latch 56 acts upon the inclined surface 51, and thereby moves the bolt 50 from right to left—i. e., withdraws the same from the recess 60—whereupon the strong spring $56^\times$ will press the large piston 44 45 downward, and thereby engage the roller 47 into the cam-groove 7 of the air-piston 6. The automatic air-pump thus started will work until the pressure of the compressed air in the pneumatic tire will have attained the highest limit. At this moment the tension of the stretched hose 15 will be sufficient to overcome the combined resistance of the two springs 54 and $56^\times$ and move the piston 44 45 upward until under the action of the nose 61 of the latch 56 upon the inclined surface 52 the bolt 50 snaps in the recess 60, whereby the automatic air-pump is again disengaged at once. In order to prevent the piston 44 from moving up too freely, a spring 79 is fastened upon the same and adapted to engage the upper edge of the recess 60. When the tension of the hose 15 is sufficient to overcome the resistance which this spring 79 offers, the latter will be forced into the groove 80, as will be readily understood.

Figs. 12 to 14 show, for instance, another modification of the engaging and disengaging device in which the strong helical spring 24 in Fig. 2 or 56 in Fig. 10 is replaced by a leaf-spring 75. This device is assumed to be inclosed in a pump-cylinder. In a recess 66 in the one cover of this cylinder a sliding piece 62 of the shape shown is mounted to move up and down. It is provided with an arm 63, adapted to engage in a suitable piston-rod 64, and thereby to lock the piston. The upper extension $62^\times$ of the sliding piece 62 is provided with a hole for guiding a disk 69, made integral with a rod 68. The upper end of the latter is guided in a suitable hole of the casing 78, secured in any known manner on the pump-cylinder 65. On the upper surface of the disk 69 rests a circular plate 70, which is adapted to bear against the lower end of a helical spring 77. The rod 68 is again connected with a moving part (corresponding to the hose 15 in Fig. 1) placed under the control of the pressure in the respective storage vessel. On the left side of the piece 62 another leaf-spring 75 is secured on a convenient support 76 and is adapted to press with its bent upper end the sliding piece 62 downward. Further, a small bell-crank lever 72 is mounted to rock on the cover of the cylinder. Its shorter arm is pivotally connected with the leaf-spring 75 by means of a link 73. The longer arm of the bell-crank lever 72 engages in a slot 71 (see Fig. 13) at the lower end of the rod 68 and is normally supported by a small leaf-spring 74 of the shape shown at Fig. 14. The moving part controlled by the pressure in the storage vessel is to move upward on this pressure sinking and downward on this pressure increasing. Now when the pump has worked and increased the pressure in the storage vessel up to the highest limit the moving part will be moved downward, whereupon the spring 77 will move the rod 68 downward until at last the upper surface of its slot 71 strikes against the bell-crank lever 72 and turns it while overcoming the tension of the spring-leaf 74. The lever 72 being thus released, the large spring 75 will move the piece 62 downward, so that its arm 63 engages in the notch $64^\times$ of the piston-rod 64 and stops the pump. On the other hand, when the moving part moves upward on the pressure in the storage vessel sinking below the lowest limit it will draw the rod 68 upward and compress the helical spring 77, while the spring-leaf 75 is pushed off to the left, so that the bell-crank lever 72 is thereby turned upward until it snaps over the bent part of the leaf-spring 74, when it will be locked.

The device shown at Figs. 12 to 14 can again be varied. The helical spring 77 may be replaced by a leaf-spring or any other spring serving the same purpose.

The engaging and disengaging device described so far can also be employed for other similar purposes—for example, for engaging and disengaging pistons or valves of automatic machines either in the manner that the roller 26 or 47 of the device engages in or withdraws from a cam-groove provided on a cylindrical surface of the piston or valve, while another organ similar to the cylinder 3 in Fig. 1 engages in this piston or valve by means of a feather and a longitudinal groove and is given a rotatory motion, or the cylindrical surface of the piston or valve is provided with a longitudinal groove, into which the roller 26 or 47 of the device engages, while the constantly-rotating organ engages in this piston or valve by means of a roller and a cam-groove, it being immaterial whether this cam-groove be arranged on the organ and the roller on the piston or valve, or vice versa. In all cases the rod 36 or 55 of the device is connected with a convenient part, which in any manner is controlled by the pressure of the respective storage vessel into which the fluid from the automatic machine is compressed.

What I claim as my invention, and desire to secure by Letters Patent, is—

1. In an engaging and disengaging device of the class described the combination with a locking device adapted to automatically engage in a groove of a moving part, of two independent springs controlling the locking device.

2. In an engaging and disengaging device of the class described the combination with a locking device adapted to automatically engage in a groove of a moving part of a plurality of independent springs controlling the locking device.

3. In an engaging and disengaging device of the class described, the combination with a cylinder secured with the one end to the automatic apparatus, of a piston reciprocating within said cylinder, a roller on the end of said piston and adapted to engage in a groove of a moving part in the automatic apparatus, a latch movable in said piston, means within said cylinder for engaging said latch, a rod controlled by the pressure in a storage vessel and adapted to act upon said latch, a primary spring within said cylinder and adapted to press said piston longitudinally toward the automatic apparatus, and a secondary spring within said cylinder and adapted to disengage said means on said rod being released.

4. In an engaging and disengaging device of the class described, the combination with a cylinder secured with the one end to the automatic apparatus, of a piston within said cylinder, a roller on the end of said piston and adapted to engage in a groove of a moving part in the automatic apparatus, a latch movable in said piston, means within said cylinder for engaging said latch, a rod controlled by the pressure in a storage vessel and adapted to act upon said latch, a plurality of independent springs within said cylinder and adapted to press said piston longitudinally toward the automatic apparatus, and a subsidiary spring within said cylinder and adapted to disengage said means on said rod being released.

5. In an engaging and disengaging device of the class described, the combination with a cylinder secured with the one end to the automatic apparatus, of a piston within said cylinder, and provided with two notches, a roller on the end of said piston and adapted to engage in a groove of a moving part in the automatic apparatus, a leaf-spring in said cylinder and adapted to snap in either notch of said piston, a latch movable in said piston and adapted to withdraw said leaf-spring from either notch, a rod controlled by the pressure in a storage vessel and connected with said latch, a primary helical spring within said cylinder and adapted to press said piston longitudinally toward the automatic apparatus, and a secondary helical spring within said cylinder and adapted to act upon said latch by means of said rod when released.

6. In an engaging and disengaging device of the class described, the combination with a cylinder secured with the one end to the automatic apparatus and provided with an annular recess, of a piston within said cylinder and provided with a cross-channel, a roller on the end of said piston and adapted to engage in a groove of a moving part in the automatic apparatus, a bolt movable in the cross-channel of said piston and adapted to engage in the annular recess of said cylinder, an external helical spring within said cylinder and adapted to press said piston longitudinally toward the automatic apparatus, a latch within said piston and adapted to actuate said bolt, a rod controlled by the pressure in a storage vessel and connected with said latch, and an internal helical spring within said piston and adapted to act upon said latch on said rod being released.

In testimony whereof I have signed my name to this specification in the presence of two subscribing witnesses.

CARL NIELSEN.

Witnesses:
 WOLDEMAR HAUPT,
 HENRY HASPER.